US009537280B2

(12) United States Patent
Li et al.

(10) Patent No.: US 9,537,280 B2
(45) Date of Patent: Jan. 3, 2017

(54) DUAL BEAMSPLITTING ELEMENT BASED EXCIMER LASER PULSE STRETCHING DEVICE (71) Applicant: The Institute of Optics and Electronics, The Chinese Academy of Sciences, Chengdu, Sichuan (CN)

(72) Inventors: Bincheng Li, Sichuan (CN); Qiang Wang, Sichuan (CN); Yanling Han, Sichuan (CN)

(73) Assignee: The Institute of Optics and Electronics, The Chinese Academy of Sciences, Chengdu, Sichuan (CN)

( * ) Notice: Subject to any disclaimer, the term of this patent is extended or adjusted under 35 U.S.C. 154(b) by 0 days.

(21) Appl. No.: 14/925,197

(22) Filed: Oct. 28, 2015

(65) Prior Publication Data
US 2016/0126690 A1 May 5, 2016

(30) Foreign Application Priority Data
Nov. 2, 2014 (CN) .......................... 2014 1 0607020

(51) Int. Cl.
*H01S 3/223* (2006.01)
*H01S 3/081* (2006.01)
(Continued)

(52) U.S. Cl.
CPC ........... *H01S 3/0817* (2013.01); *H01S 3/0057* (2013.01); *H01S 3/0813* (2013.01); *H01S 3/225* (2013.01)

(58) Field of Classification Search
CPC .. H01S 3/08059; H01S 3/0817; H01S 3/0813; H01S 3/225; G02B 27/14
See application file for complete search history.

(56) References Cited

U.S. PATENT DOCUMENTS 5,590,141 A * 12/1996 Baird ...................... G02F 1/377
372/10
6,389,045 B1 * 5/2002 Mann .................... H01S 3/0057
372/100
(Continued)

FOREIGN PATENT DOCUMENTS

CN        101900948 B      6/2013

OTHER PUBLICATIONS

Burkert, A. et al., "Pulse stretcher with variable pulse length for excimer laser applications", Review of Scientific Instruments, 81: 033104-1-033104-5, 2010.

*Primary Examiner* — Yuanda Zhang
(74) *Attorney, Agent, or Firm* — Merchant & Gould P.C.

(57) ABSTRACT

The present invention discloses a dual beamsplitting element based excimer laser pulse stretching device comprising two beam splitting elements and one confocal resonator. The first beamsplitting element splits incident laser beam into two beams, one beam enters the confocal resonator, generates a certain time delay and then is incident on the second beamsplitting element, and the second beam is directly incident on the second beamsplitting element. The second beamsplitting element further splits each of the incident laser beams into two beams, one of the two beams enters the confocal resonator, generates a certain time delay and is returned back to the first beamsplitting element to be further split, and the other of the two beams is combined with other beams which are direct outputs after being split by the beamsplitting elements or being optically delayed by the confocal resonator to form a stretched output beam. The present invention may effectively enhance the efficiency of the pulse stretching, decrease the peak power of the stretched beam, and increase the lifetime of optical elements used in the excimer laser photolithography systems.

7 Claims, 5 Drawing Sheets (51) Int. Cl.
*H01S 3/00* (2006.01)
*H01S 3/225* (2006.01)

(56) References Cited

U.S. PATENT DOCUMENTS

| | | | |
|---|---|---|---|
| 7,035,012 B2 | 4/2006 | Govorkov et al. | |
| 7,415,056 B2 | 8/2008 | Das et al. | |
| 7,620,080 B2 * | 11/2009 | Cobb | G03F 7/70025 |
| | | | 372/13 |
| 8,724,203 B2 * | 5/2014 | Michaloski | G02B 27/48 |
| | | | 359/238 |
| 2006/0216037 A1 | 9/2006 | Wiessner et al. | |
| 2008/0197238 A1 * | 8/2008 | Bae | F03H 3/00 |
| | | | 244/171.1 |
| 2015/0372446 A1 * | 12/2015 | Chuang | H01S 3/10046 |
| | | | 372/25 |

* cited by examiner

DUAL BEAMSPLITTING ELEMENT BASED EXCIMER LASER PULSE STRETCHING DEVICE

CROSS-REFERENCE TO RELATED APPLICATION(S)

This application claims priority to Chinese Application No. 201410607020.5 filed on Nov. 2, 2014 and entitled "Dual beamsplitting element based excimer laser pulse stretching device", which is incorporated herein by reference in their entirety.

TECHNICAL FIELD OF THE INVENTION

The present disclosure relates to a technical field for regulating output beam parameters of excimer lasers used in photolithography systems, in particular, to dual beamsplitting element based excimer laser pulse stretching device.

BACKGROUND

In manufacturing of very large scale integrated circuits, photolithography by excimer laser is one of the most important processes. At present, the primary laser source used for photolithography device for semiconductor integrated circuits manufacture is an excimer laser of Argon Fluoride (ArF) or Krypton Fluoride (KrF) with output wavelengths of 193 nm or 248 nm, respectively. In a photolithography device, a large number of deep ultraviolet optical elements are utilized, including reflective optical elements, transmissive optical elements, attenuating optical elements and the like, to shape, transmit and control the laser beam with wavelength of 193 nm or 248 nm. Among these optical elements there is a large number of elements for the imaging objective lens. The manufacturing of these elements for the imaging objective lens is difficult and expensive. On the other hand, when these deep ultraviolet optical elements are under long-term irradiation of excimer laser beam at wavelength 193 nm or 248 nm, color centers or other physical or chemical processes may occur within these elements, which leads to a slow degradation of their optical property until a disastrous damage occurs and the lifetime of these optical elements ends. Previous researches show that the degree of degradation of the optical property of these optical elements is directly related to the power density of the laser beam irradiation ($P=E/\tau$, wherein P is the power density, E is the energy of the pulse, and $\tau$ is the pulse width). The higher the power density, the faster the degradation, and the shorter the lifetime. On the other hand, in order to enhance the yields of the photolithography devices, energy of the output pulse of excimer laser for photolithography is continuously increasing in recent years, from 5 mJ at the early stage to 10 mJ and 15 mJ at present. However, the pulse width of the output pulse of the laser is basically not changed, and is still around 20 ns. The increase of the pulse energy may greatly shorten the lifetime of the optical elements used in the photolithography devices, especially that of the expensive optical elements of the imaging objective lens.

One effective means for increasing the yields of photolithography devices with the increasing output pulse energy of the excimer laser but without decreasing (but on the contrary even extending) the lifetime of the optical elements is to stretch the width of the output pulse of the excimer laser. For example, if the output energy of laser pulse is increased from 5 mJ to 15 mJ and at the same time the pulse width of the laser beam is extended from 20 ns to 60 ns, the power density of the laser beam in the optical photolithography system is kept the same, so it does not affect the lifetime of the optical elements. On the other hand, if the pulse width is extended to 120 ns, the power density is reduced to be one half, the lifetime of the optical elements may be effectively extended and the use cost of the photolithography system can be reduced.

Since the output pulse width of the excimer laser is kept to be basically constant (around 20 ns), a pulse stretching device can be utilized to extend the pulse width. The method for stretching the pulse width of the excimer laser is mainly based on beam splitting by splitting elements and time delaying by optical resonators. In this method, one pulse is divided into overlapping of a plurality of pulses with different time delays, overall the pulse is extended in duration. A conventional pulse stretching device generally utilizes one beamsplitting element and one confocal resonator to achieve a ratio of pulse stretching (the ratio of the width of the stretched output pulse to that of the original input pulse) of around 2.5-3.0. If a higher ratio of pulse stretching is required, a plurality of pulse stretchers (in series) are utilized. For example, a Chinese Patent application with an application number 201010178364.9 and entitled "Pulse stretcher with a decreased power density within optical components" discloses a pulse stretching device based on one beamsplitting element and one confocal resonator constituted of two spherical reflective mirrors. The basic configuration of this pulse stretching device is identical to that of the conventional pulse stretching device except for that a folded reflective mirror is added to implement a compact configuration and a beam expander is added to decrease the probability of damaging the optical elements in the device. Other possible alternatives mainly include configuration modification of the optical resonator, for example a resonator having three reflective mirrors (U.S. Pat. No. 7,035,012 "Optical pulse duration extender"), a resonator with four reflective mirrors (U.S. Pat. No. 7,415,056, "Confocal pulse stretch"), and so on. In order to increase the ratio of pulse stretching, Burkert et al. [A. Burkert, J. Bergmann, W. Triebel, and U. Natura, "Pulse stretcher with variable pulse length for excimer laser applications", Review of Scientific Instruments 81, 033104(2010)] put two pulse stretching devices in series. In other methods for further increasing the ratio of pulse stretching, for example, a retro-reflective mirror is employed to reflect the stretched output beam back into the pulse stretching device for twice stretching so to implement a quadratic stretching (US2006/0216037: "Double-pass imaging pulse-stretch"). In these methods and devices, the pulse stretching systems based on one beamsplitting element and one optical resonator either have a lower ratio of pulse stretching, or the stretched output pulses have a poor temporal waveform. The methods and devices based on two pulse stretching devices in series or quadratic stretching by utilizing a retro-reflective mirror lead to a larger energy loss since there is reflection loss for every reflection (e.g. the typical reflectivity of a reflective mirror at 193 nm is around 98%).

SUMMARY

The technical problems to be solved by the present invention are to overcome the deficiency of the prior art by providing an excimer laser pulse stretching device employing two beamsplitting elements and one conformal resonator, so as to remarkably improve the temporal waveforms of the stretched output pulses and to enhance the ratio of pulse stretching in a certain extent without notably increasing the loss of the pulse energy.

The technical solution to the technical problems mentioned above is as follows. A dual beamsplitting element based excimer laser pulse stretching device employs two beamsplitting elements and one confocal resonator. The first beamsplitting element splits incident laser beam into two beams, one beam enters the confocal resonator, generates a certain time delay and then is incident on the second beamsplitting element, and the second beam is directly incident on the second beamsplitting element. The second beamsplitting element further splits each of the incident laser beams into two beams, one of the two beams enters the confocal resonator, generates a certain time delay and is returned back to the first beamsplitting element to be further split, and the other of the two beams is combined with other beams which are direct outputs after being split by the beamsplitting elements or being optically delayed by the confocal resonator to form a stretched output beam.

The confocal resonator may be constituted of four spherical reflective mirrors or may be constituted of two spherical reflective mirrors. The radius of curvature of the spherical reflective mirrors is determined according to actual requirements.

The length of the confocal resonator is determined by the period of the optical delay required for the pulse stretching, i.e. $L=c \cdot t$, in which L is the length of the resonator, c is velocity of light and t is the period of the optical delay.

Splitting ratios of the two beamsplitting elements are optimized according to the reflectivity of the mirrors of the confocal resonator and the optical loss of the beamsplitting elements. When the reflectivity of the mirrors is larger than 97% and the optical loss of the beamsplitting elements is less than 2%, the splitting ratio of the first beamsplitting element, i.e. the ratio of reflection/transmission, ranges between 0.20/0.80 and 0.30/0.70, and the splitting ratio of the second beamsplitting element, i.e. the ratio of reflection/transmission, ranges between 0.60/0.40 and 0.70/0.30.

Incident angles of the two beamsplitting elements in use are 45±5°.

An anti-reflectively coated optical window having a thickness equal to the sum of the thicknesses of the two beamsplitting elements may be inserted along the stretched output beam path to compensate the position offset caused by the beamsplitting elements, and the incident angle of the anti-reflectively coated optical window in use is anti-symmetric to that of the beamsplitting elements in use.

One or more folded mirrors may be inserted into the excimer laser pulse stretching device to form e stretching a compact configuration.

The excimer laser pulse stretching device is purged with high-purity nitrogen gas when the stretching device is used for excimer lasers with wavelength shorter than 200 nm.

As compared with the pulse stretching techniques based on single beamsplitting element, the present invention has the following advantages. Without notably increasing the energy loss of the stretched pulse, the present invention may effectively improve the temporal waveform of the stretched output pulse, further decrease the transient peak power of the stretched output pulse, enhance the ratio of pulse stretching, and increase the lifetime of the optical elements used in the excimer laser photolithography systems.

BRIEF DESCRIPTION OF THE DRAWINGS

FIGS. 3(a) and 3(b) schematically show the configuration of the pulse stretching device utilizing two beamsplitting elements and one confocal resonator having two or four reflective mirrors and utilizing a reflective mirror to fold the resonator according to the present invention: FIG. 3(b) shows that with a folded confocal resonator having two reflective mirrors.

DETAILED DESCRIPTION

The present invention is further illustrated in conjunction with accompanying figures and particular embodiments.

Figure 1:
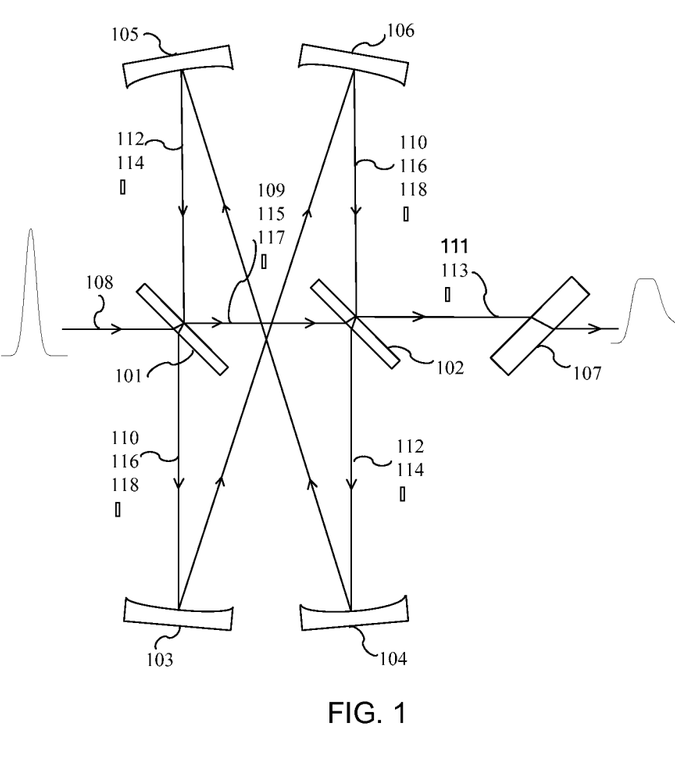
FIG. 1 shows a schematic view of the configuration of the pulse stretching device utilizing two beamsplitting elements and one confocal resonator having four reflective mirrors according to the present invention.

As shown in FIG. 1, according to the present invention, a pulse stretching device consisting of two beamsplitting elements and one confocal resonator with four reflective mirrors is constituted of beamsplitting element 101, beamsplitting element 102, resonator cavity mirror 103, resonator cavity mirror 104, resonator cavity mirror 105, and resonator cavity mirror 106, and optical window 107. An incident laser beam 108 is split by the first 45-degree beamsplitting element 101 into two beams, i.e. a transmitted beam 109 and a reflected beam 110. The transmitted beam 109 is directly incident on the second 45-degree beamsplitting element 102 to be further split, and the reflected beam 110 is delayed by the resonator cavity mirrors 103 and 106 and then is incident on the second 45-degree beamsplitting element 102 to be further split. Each beam (109 and 110) incident on the second beamsplitting element 102 is further split into two beams (beams 111 and 112 for beam 109, and beams 113 and 114 for beam 110), one (beams 111 and 113) of which is directly output and the other (beams 112 and 114) of which is delayed by the resonator cavity mirrors 104 and 105 and is then incident on the first beamsplitting element 101 to be further spit. Such a process is continuously repeated, leading to that the input pulse is split and delayed a plurality of times and then forming the output beam with effectively reduced peak power and effectively stretched pulse width.

The length of the confocal resonator in the pulse stretching device of the present invention, defined as the propagation distance of the beam reflected by beamsplitting element 101 passes resonator cavity mirrors 103, 106, 104 and 105, and back to 101, should be determined by the period of the optical delay required for the pulse stretching. In general the length should be the propagation distance of the beam within the period of the optical delay, or within the original pulse width, that is, $L=c \cdot t$, in which L is the length of the resonator, c is velocity of light and t is the period of the optical delay or the original pulse width. The radius of curvature of the resonator mirror is determined according to the divergence angle of the input laser beam and the length of the resonator. The radii of curvature of all four cavity mirrors may be identical to or different from each other.

Splitting ratios of the two beamsplitting elements in the pulse stretching device of the present invention should be optimized according to the reflectivity of the cavity mirrors of the confocal resonator and the optical loss of the beamsplitting elements. When the reflectivity of the cavity mirrors 103, 104, 105 and 106 are larger than 97% and the optical loss of the beamsplitting elements 101 and 102 are less than 2%, the splitting ratio of the first beamsplitting element 101, i.e. the ratio of reflection/transmission, preferably ranges between 0.20/0.80 and 0.30/0.70, and the splitting ratio of the second beamsplitting element 102, i.e. the ratio of reflection/transmission, preferably ranges between 0.60/0.40 and 0.70/0.30.

Figure 2:
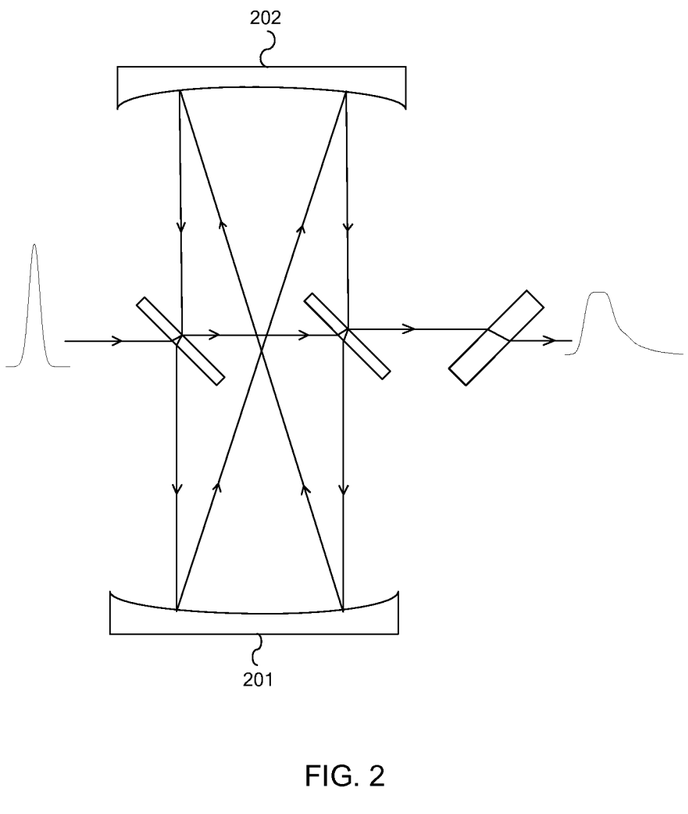
FIG. 2 shows a schematic view of the configuration of the pulse stretching device utilizing two beamsplitting elements and one confocal resonator having two reflective mirrors according to the present invention.

The confocal resonator of the pulse stretching device of the present invention may also be constituted of two cavity mirrors, as shown in FIG. 2. The resonator mirrors 103 and 104 and the resonator mirrors 105 and 106 in the confocal resonator with four cavity mirrors (shown in FIG. 1) may be replaced by two cavity mirrors 201 and 202, one for 103 and 104, and another one for 105 and 106, respectively. And their functions are identical to that of the resonator mirrors 103 and 104 and that of the resonator mirrors 105 and 106, respectively. The advantage of using two cavity mirrors instead of four cavity mirrors is easy installation due to the reduction of number of optical elements. The disadvantage is that the size of the cavity mirrors and also the cost for manufacturing the cavity mirrors are increased.

Figure 3A:
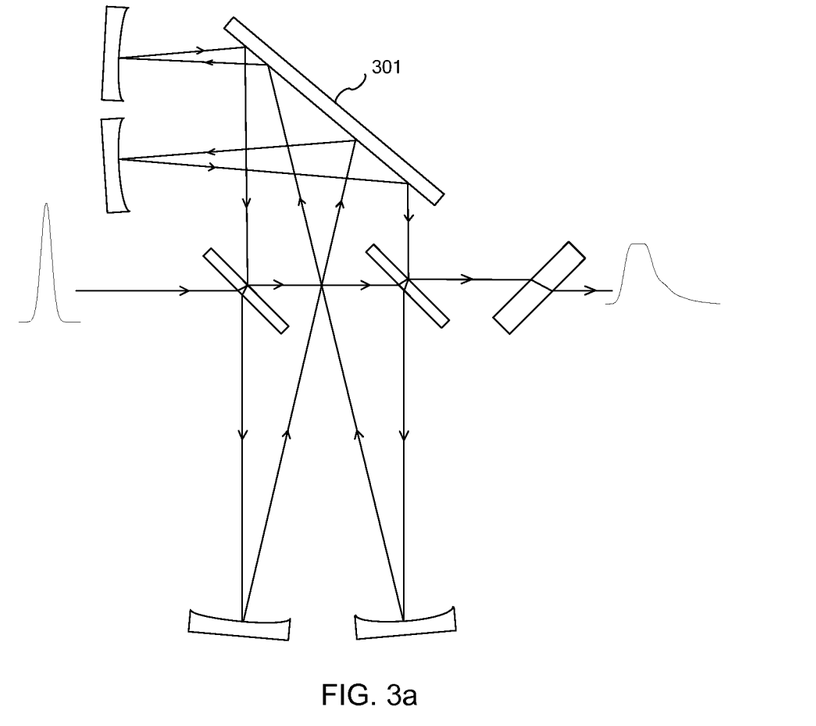
FIG. 3(a) shows the dual beamsplitting element based pulse stretching device with a folded confocal resonator having four reflective mirrors.
Figure 3B:
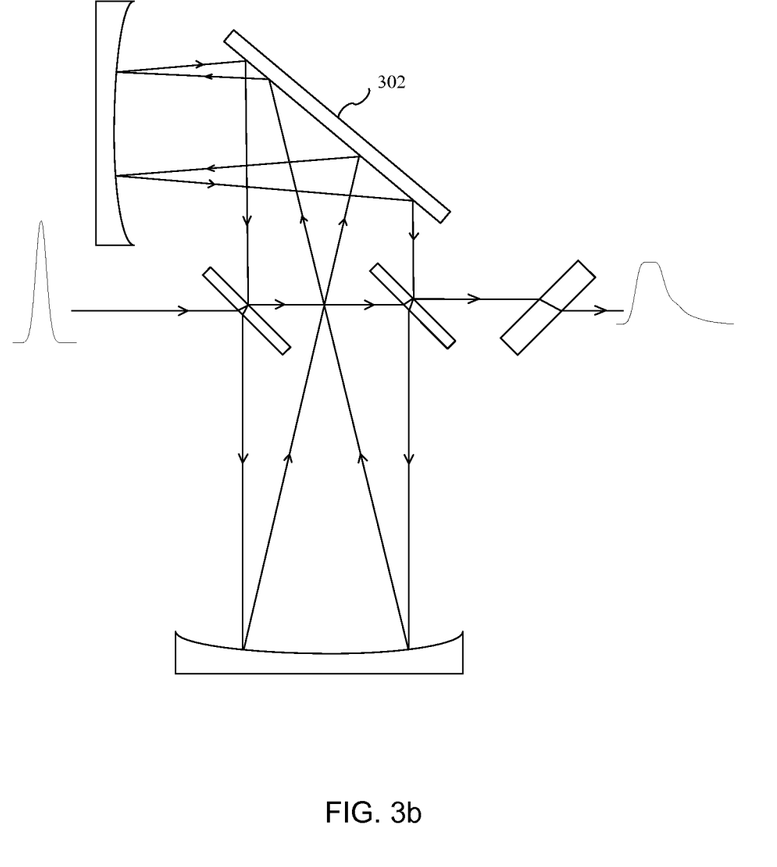

In actual use, if the pulse stretching device of the present invention has a longer length of the resonator, folded reflective mirrors (301 and 302) may be utilized to fold the resonator, as shown in FIG. 3, so that the pulse stretching device has a compact configuration. The incident angle of the folded reflective mirror is generally 45°, and may also be any angles less than 45°.

Figure 4:
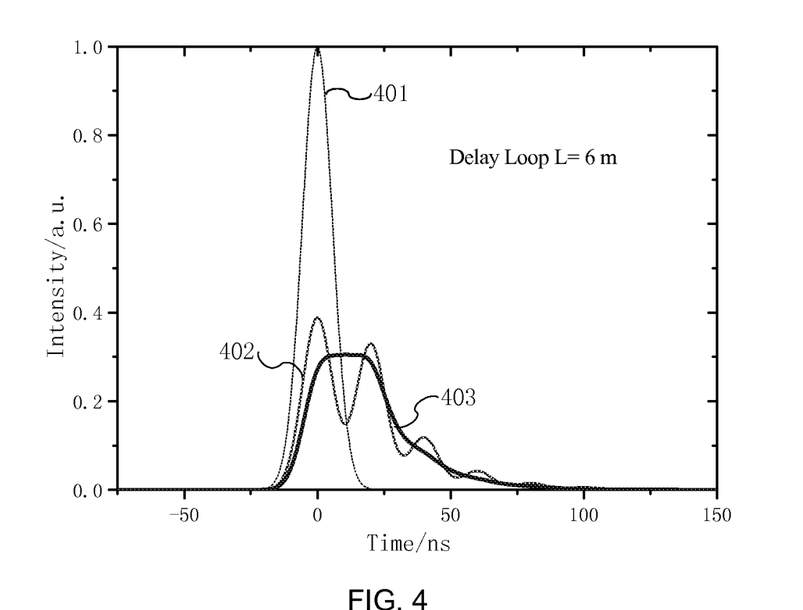
FIG. 4 shows a comparison between the temporal waveforms of the output pulses obtained after being stretched by the pulse stretching device of the present invention and after being stretched by the conventional pulse stretching device having single beamsplitting element.

To illustrate the advantages of the pulse stretching device of the present invention, FIG. 4 shows a comparison between the temporal waveforms (402 and 403) of the output pulses obtained after being stretched by the pulse stretching device of the present invention and after being stretched by the conventional pulse stretching device having single beamsplitting element. In this example, it is assumed that the width of the input laser beam (401) is 20 ns (TIS), the resonator length is 6 meters, the reflectivity of the cavity mirrors 103, 104, 105 and 106 is 98%, the optical loss of the beamsplitting elements 101 and 102 is 0.015, and the ratios of the reflection/transmission of beamsplitting element 101 and 102 are 0.266/0.719 and 0.669/0.316, respectively. After the input pulse is stretched by the pulse stretching device, the pulse width is extended by 2.75 times to be 55 ns, the energy of the stretched pulse is 87.5% of that of the input pulse, and the peak power of the stretched pulse is 0.305 times of that of the input pulse. In this case, the stretched pulse has a very flat waveform (403) without distinctive peaks. In such a pulse stretching device, if beamsplitting element 102 is removed and the ratio of reflection/transmission of beamsplitting element 101 is modified to be 0.597/0.388, a conventional pulse stretching device with single beamsplitting element is formed. The conventional pulse stretching device has a ratio of pulse stretching of 2.80, i.e. the pulse width after being stretched becomes to 56 ns, the energy of the stretched pulse is 90% of that of the input pulse, and the peak power of the stretched pulse is 0.388 times of that of the input pulse. There are pluralities of peaks in the temporal waveform (402) of the stretched output pulse. By comparing the results of this example of the present invention and that of the conventional pulse stretching device with single beamsplitting element, the peak power of the stretched pulse is more effectively decreased, the temporal waveform of the stretched pulse is much flatter, and therefore the lifetime of the optical elements used in photolithography systems may be substantially extended.

Figure 5:
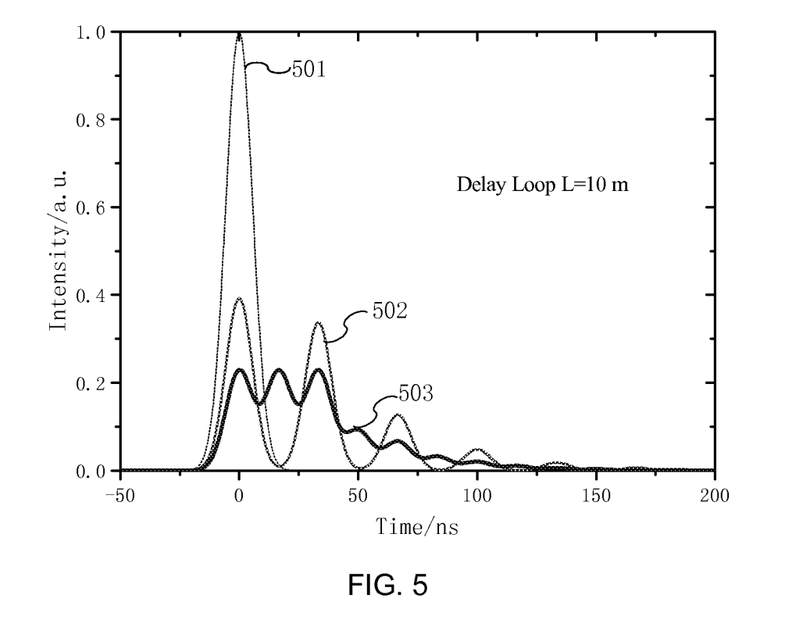
FIG. 5 shows a comparison between the temporal waveforms of the output pulses obtained after being stretched by the pulse stretching device of the present invention and after being stretched by the conventional pulse stretching device having a single beamsplitting element, in which the length of the optical resonator in FIG. 5 is longer than that in FIG. 4.

With the pulse stretching device of the present invention, the ratio of the pulse stretching can be further increased and the peak power of the stretched pulse can be further reduced by increasing the cavity length of the resonator. FIG. 5 shows the stimulated temporal waveforms (502 and 503) of the output beams stretched by stretching devices with single and two beamsplitting elements and confocal resonator with 10-meter cavity length. The ratios of the reflection/transmission of the beamsplitting elements 101 and 102 are re-optimized to be 0.279/0.706 and 0.671/0.314, respectively, and the reflectivity of the cavity mirrors and the optical loss of the beamsplitting elements are the same as that in FIG. 4. With the dual beamsplitting element pulse stretching device, the pulse width is stretched by 4.09 times to 82 ns, the energy of the stretched pulse is 87.4% of that of the input pulse and the peak power of the stretched pulse is 0.225 times of that of the input pulse. In addition, the temporal waveform (503) of the stretched pulse is basically flat and has only small fluctuations.

Although the invention is illustrated and described herein with reference to specific embodiments, the present invention is not limited to the details shown. Rather, various modifications may be made in the details within the scope and range of the equivalents of the claims and without departing from the invention.

What is claimed is:

1. An dual beamsplitting element based excimer laser pulse stretching device, characterized by comprising two beamsplitting elements with identical orientation and optimized splitting ratios and one confocal resonator, the splitting ratios of the two beamsplitting elements are optimized according to a reflectivity of the mirrors of the confocal resonator and an optical loss of the beamsplitting elements, when the reflectivity of the mirrors is larger than 97% and the optical loss of the beamsplitting elements is less than 2%, the splitting ratio of the first beamsplitting element, i.e. the ratio of reflection/transmission, ranges between 0.20/0.80 and 0.30/0.70, and the splitting ratio of the second beamsplitting element, i.e. the ratio of reflection/transmission, ranges between 0.60/0.40 and 0.70/0.30, the first beamsplitting element splits incident laser beam into a transmitted beam and a reflected beam, the reflected beam enters the confocal resonator, generates a certain time delay and then is incident on the second beamsplitting element, and the transmitted beam is directly incident on the second beamsplitting element; the second beamsplitting element further splits the transmitted/reflected laser beams into two beams, one of the two beams enters the confocal resonator, generates a certain time delay and is returned back to the first beamsplitting element to be further split, and the other of the two beams is combined with other beams which are direct outputs after being split by the beamsplitting elements or being optically delayed by the confocal resonator to form a stretched output beam.

2. The dual beamsplitting element based excimer laser pulse stretching device of claim 1, characterized by that the confocal resonator is constituted of four spherical reflective mirrors or is constituted of two spherical reflective mirrors, and a radius of curvature of the spherical reflective mirrors is determined by divergence angle of the input laser beam and length of the confocal resonator.

3. The dual beamsplitting element based excimer laser pulse stretching device of claim 1, characterized by that a length of the confocal resonator is determined by a period of the optical delay required for the pulse stretching, i.e. L=a·c·t, in which L is the length of the confocal resonator, c is velocity of light and t is the period of the optical delay, and a is a value between 1.0 to 2.0.

4. The dual beamsplitting element based excimer laser pulse stretching device of claim 1, characterized by that incident angles of the two beamsplitting elements in use are 45±5°.

5. The dual beamsplitting element based excimer laser pulse stretching device of claim 1, characterized by that an anti-reflectively coated optical window having a thickness equal to a sum of the thicknesses of the two beamsplitting elements is inserted along a stretched output beam path to compensate a position offset caused by the beamsplitting elements, and an incident angle of the optical window in use is anti-symmetric to that of the beamsplitting elements in use.

6. The dual beamsplitting element based excimer laser pulse stretching device of claim 1, wherein one or more folded reflective mirrors can be inserted into the excimer laser pulse stretching device to form a compact configuration.

7. The dual beamsplitting element based excimer laser pulse stretching device of claim 1, wherein the excimer laser pulse stretching device is purged with high-purity nitrogen gas when the stretching device is used for excimer lasers with wavelength shorter than 200 nm.

* * * * *